United States Patent [19]
Yinger et al.

[11] Patent Number: 5,960,204
[45] Date of Patent: *Sep. 28, 1999

[54] SYSTEM AND METHOD FOR INSTALLING APPLICATIONS ON A COMPUTER ON AN AS NEEDED BASIS

[75] Inventors: Glenn S. Yinger, Parker; Charles E. McVaney, Englewood; James L. Foos, Highlands Ranch, all of Colo.

[73] Assignee: J.D. Edwards World Source Company, Denver, Colo.

[ * ] Notice: This patent issued on a continued prosecution application filed under 37 CFR 1.53(d), and is subject to the twenty year patent term provisions of 35 U.S.C. 154(a)(2).

[21] Appl. No.: 08/740,360

[22] Filed: Oct. 28, 1996

[51] Int. Cl.⁶ .............................. G06F 13/00; G06F 9/445
[52] U.S. Cl. ...................................... 395/712; 395/200.51
[58] Field of Search ................................ 395/712, 200.5, 395/200.51, 200.52, 651, 652, 653

[56] References Cited

U.S. PATENT DOCUMENTS

| | | | |
|---|---|---|---|
| 4,954,941 | 9/1990 | Redman | 395/712 |
| 5,155,847 | 10/1992 | Kirouac et al. | 395/200.51 |
| 5,339,430 | 8/1994 | Lundin et al. | 395/712 |
| 5,359,730 | 10/1994 | Marron | 395/712 |
| 5,421,009 | 5/1995 | Platt | 395/200.51 |
| 5,421,017 | 5/1995 | Scholz et al. | 395/712 |
| 5,473,772 | 12/1995 | Halliwell et al. | 395/712 |
| 5,495,610 | 2/1996 | Shing et al. | 395/200.51 |
| 5,586,304 | 12/1996 | Stupek, Jr. et al. | 395/712 |
| 5,619,716 | 4/1997 | Nonaka et al. | 395/712 |
| 5,666,501 | 9/1997 | Jones et al. | 395/712 |
| 5,706,431 | 1/1998 | Otto | 395/200.51 |
| 5,708,811 | 1/1998 | Arendt et al. | 395/712 |
| 5,732,275 | 3/1998 | Kullick et al. | 395/712 |

OTHER PUBLICATIONS

"Microsoft Systems Management Server", Microsoft Corporation, Redmond, WA, 1994.

"Microsoft Systems Management Server for Windows NT Administrator's Guide", Document No. 66254, Microsoft Corporation, Redmond, WA, 1993–1995.

"OneWorld Integrated Toolset Highlights", J.D. Edwards & Co., Denver, CO, 1995.

*Primary Examiner*—Eric W. Stamber
*Attorney, Agent, or Firm*—Fenwick & West LLP

[57] ABSTRACT

A data processing system for computer application installation on a client/server network on an as needed basis is disclosed. The server computer includes an installation unit, a system application repository, and a user information file. The client computer includes a menu driver, an application check unit, a local application repository, and a local version repository. A user on the client computer selects an application to execute through the menu driver. The application check unit searches the local application repository and the local version repository for the application and, if found, determines whether it is the most current version unless the most current version is already installed on the client computer. After installation is completed on the client computer, the application is automatically executed. Further, the present invention includes a method for installing a computer applications and/or update on an as needed basis.

12 Claims, 12 Drawing Sheets

```
SECURITY TABLE  880

885 ↘                  890 ↘
USER GROUPING         APPLICATION GROUPING
USER                  APPLICATION
USER                  SUITE (SYSTEM)
USER                  *ALL
GROUP                 APPLICATION
GROUP                 SUITE (SYSTEM)
GROUP                 *ALL
PUBLIC                APPLICATION
PUBLIC                SUITE (SYSTEM)
PUBLIC                *ALL
```

SYSTEM AND METHOD FOR INSTALLING APPLICATIONS ON A COMPUTER ON AN AS NEEDED BASIS

BACKGROUND OF THE INVENTION

1. Field of the Invention

This invention relates generally to network application development, and specifically to a network system that installs an application and/or application changes from a server computer to a client computer on an as needed basis.

2. Description of the Related Art

Modern data processing systems are often implemented in network configuration such as "client/server" configurations in which a number of client computers, typically personal computers or workstations, communicate with one or more "server" computers and request server computers to perform processing tasks.

One such task performed by server computers is to install new applications, i.e., computer applications, or update existing applications on client computers. A known method of performing this task is to automatically and periodically install all new applications or application changes on each client computer. However, periodically installing all new applications or application changes on each client computer is time consuming and wastes valuable system resources because not all users need all the applications or application changes that are on the client/server system. Moreover, recent changes made to an application on a client computer may result in over writing files during the installation process that do not require further changes.

Another known installation method, designed to use system resources more efficiently than the above-described method, is to notify all users when an application module has changed or when a new application module is available so that users may select and control which application modules or application changes will be installed on their computer. However, this method requires that users themselves instruct the system to install the desired applications or application changes. This method, however, may lead to human errors that would cause the application files to be corrupted or incorrectly installed.

Therefore, it is desirable to have a more reliable and efficient system and method for installing and updating applications on a client computer than is currently known.

SUMMARY OF THE INVENTION

The present invention provides a system and a method for installing new applications and updating existing applications on a computer node within computer network environment, such as a client/server system, where the application installations are automatically performed on an as needed basis and then the applications are automatically executed after installation. A client/server system in accordance with the present invention includes at least one server computer and at least one client computer connected through a network.

In response to a client computer receiving a request from a user to run an application, the client computer determines whether the application exists on the client computer. In response to the application existing on the client computer, the client computer runs the application. Otherwise, if the desired application is available on a server computer, the server computer automatically installs the application on the client computer, which then automatically executes the application after installation.

In an alternate embodiment of the present invention, if the application to be executed exists on the client computer, the client computer determines whether the application is the most recent version of the application available on the client/server system. In response to the application not being the most recent version available, a server computer automatically installs an updated application on the client computer, which then automatically executes the application after installation of the updated application.

The system and the method in accordance with the present invention minimizes use of valuable system resources, such as storage device space on the client computer, because not all new or updated application modules are necessarily installed on each client computer. Moreover, unless the client/server system is instructed otherwise, an application is not installed until a user decides to run the application, thereby helping to ensure that the client computer runs the most recent application available to the server computer and helping to ensure that older versions of the application are not unnecessarily installed. In addition, human errors, such as over writing critical files, installing improper files, and accessing unauthorized files, are also minimized because any application needing to be installed is automatically installed without the requirement of user intervention.

The features and advantages described in this specification are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION OF A PREFERRED EMBODIMENT

The present invention operates in a data processing system that includes a network computing environment in accordance with the present invention. The network environment includes nodes, such as personal computers or workstations, coupled together through a network system. Further, the network may be configured as a client/server environment where some nodes are servers, some nodes are clients, and some nodes serve as both servers and clients.

Figure 1A:
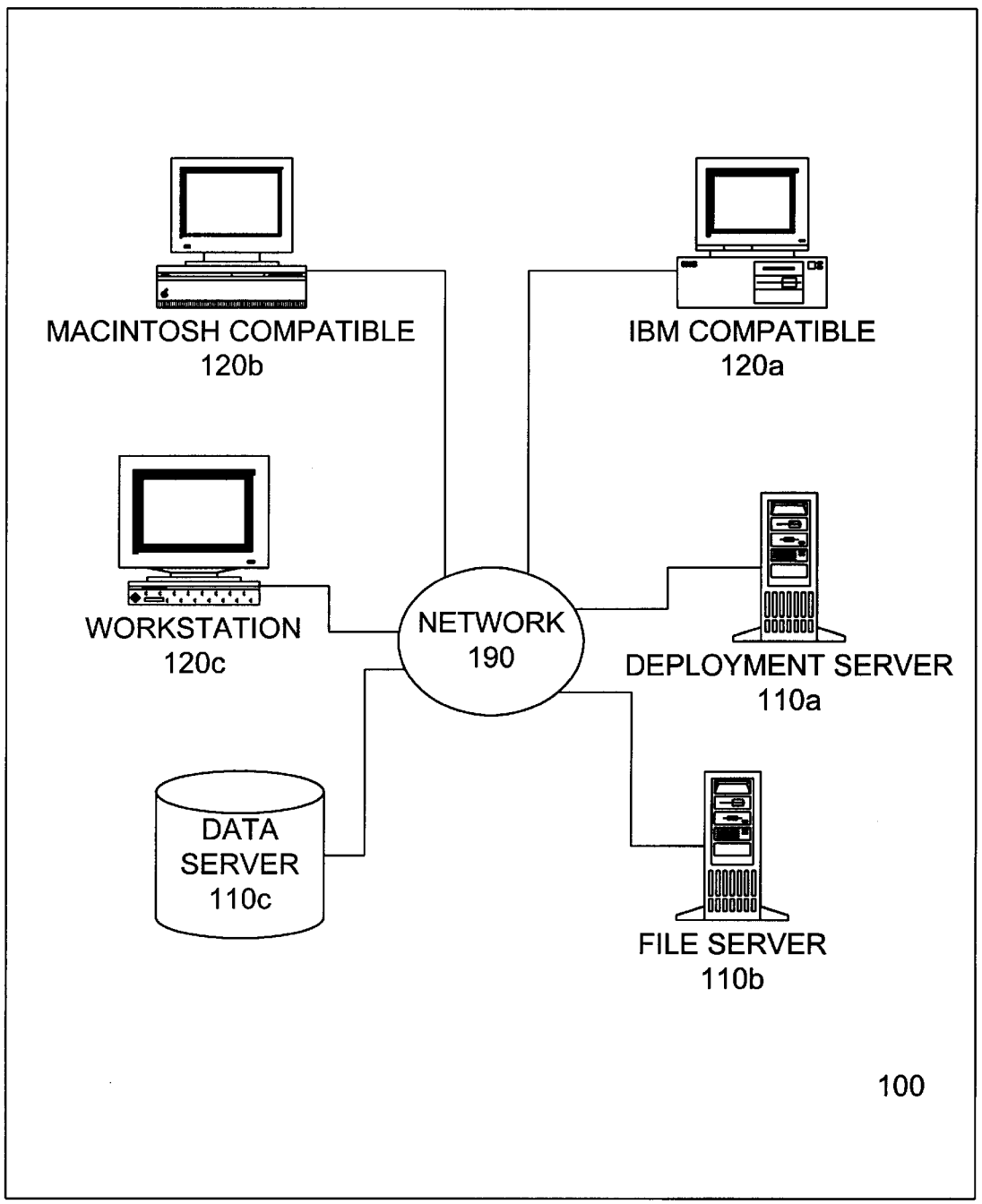
FIG. 1A is a diagram illustrating a computer network environment, such as a client/server environment, in accordance with the present invention.

FIG. 1A is a block diagram illustrating a client/server system 100 for data processing in accordance with the present invention. The client/server system includes server computers 110a–110c and client computers 120a–120c connected through a network 190. Each connection on the network 190 may be referred to as a node.

Figure 1B:
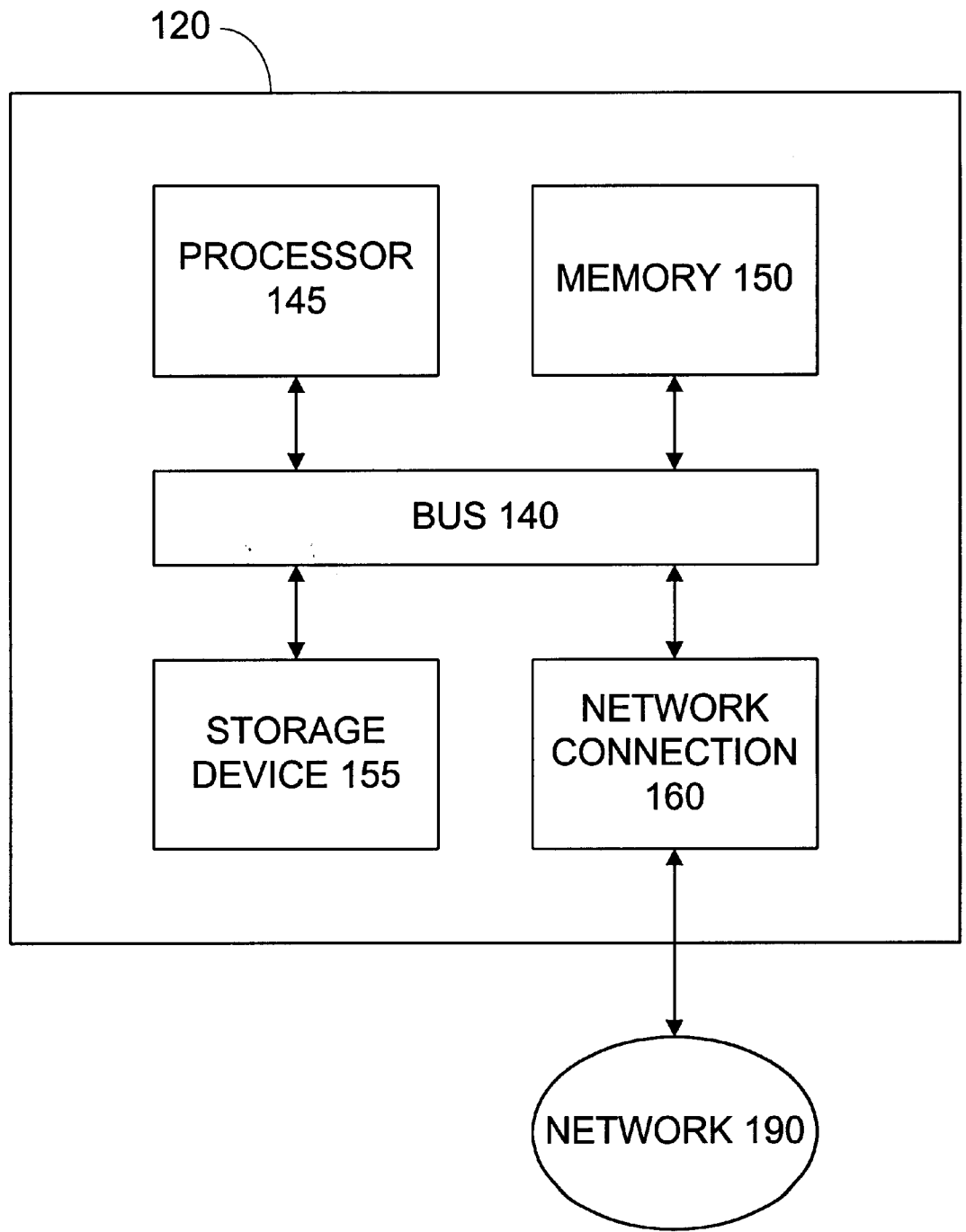
FIG. 1B is a block diagram illustrating components of a client computer in accordance with the present invention.

In a preferred embodiment of the present invention, the client computers 120a–120c are conventional personal computers or workstation machines having conventional hardware components such as a bus 140, a processor 145, a memory 150, a storage device 155, and a network connection 160, as illustrated in FIG. 1B. The processor may be a conventional processor that is commercially available such as a Pentium™ processor by Intel Corporation (Santa Clara, Calif.), a PowerPC™ processor by IBM Corporation (Armonk, N.Y.) or Motorola, Inc. (Schaumburg, Ill.), an Alpha™ processor by Digital Equipment Corporation (Maynard, Mass.), or a SPARC™ processor by Sun Microsystems, Inc. (Mountain View; Calif.). The client computers 120a–120c use conventional software operating environments that are commercially available such as Microsoft Windows™ (Redmond, Wash.), Apple System 7.x (Cupertino, Calif.), or Unix-based operating systems. In various embodiments, the client computers 120a–120c connected to the network 190 may be of the same or different hardware and software platform types.

The server computers 110a–110c may be conventional personal computers, workstation machines, mid-range computer platforms, or large system computer platforms. The server computers 110a–110c have conventional hardware components, such as those illustrated for the client computer 120 in FIG. 1B, including a bus, a processor, a memory, a storage device, and a network connection. The server computers 110a–110c use conventional software operating environments depending on the available hardware platform. For example, an OS/400 operating system is commonly used on an AS/400™ mid-range computer by IBM Corporation (Armonk, N.Y.), an HP-UX operating system is used on an HP-9000™ mid-range computer by Hewlett-Packard Corporation (Palo Alto, Calif.), a Microsoft Windows NT™ operating system is used on an Alpha™ System by Digital Equipment Corporation (Maynard, Mass.), or a MVS and a VM operating system is used on an ES/9000™ large system computer by IBM Corporation (Armonk, N.Y.). The server computers 110a–110c may also operate on other conventional software operating environments such as Microsoft Windows or Unix. Similar to the client computers 120a–120c, the server computers 110a–110c connected to the network 190 may, in various embodiments, be of the same or different hardware and software platforms.

The network 190 interconnects the client computers 120a–120c and the server computers 110a–110c. In a preferred embodiment the network 190 is a conventional logical network such as a local area network ("LAN") or a wide area network ("WAN"), as appropriate for the particular embodiment in which the system 100 is to operate. In accordance with the present invention, the logical network is physically implemented using commercially available conventional network hardware and software such as a file server computer using a Novell Netware™ from Novell Corporation (Provo, Utah) or Microsoft Windows NT™ from Microsoft Corporation (Redmond, Wash.) network operating system software.

In a preferred embodiment of the present invention, the server computers 110a–110c include application suites and application modules. The application suites relate to computer application programs that perform enterprise functions such as payroll, inventory, accounts payable, and budgeting. The application suites are further defined by individual applications or application modules that include data or information that is usually specific to the particular application suite to which the application module is associated. For example, the payroll suite may include a time entry application module and an address application module, as well as a compensation application module, all of which are required to process a payroll in an enterprise.

The server computers 110a–110c may also include application packages. The application packages are comprised of one or more application modules or programs from the one or more application suites. The application packages may include only particular application modules from one or more application suites, but not an entire application suite, or may include one or more entire application suites plus particular application modules from other application suites. Commercially-available third-party applications also may be bundled into an application package. Each application module is comprised of a logical group of forms that are associated with specific application functions or elements, such as data entry or file browsing. As will be further described below, the system and method of the present invention installs application suites, application modules, and/or application packages on an as needed basis. For purposes of discussion only, the system and method of the present invention will be described from an application module perspective.

The client/server environment provides an advantage of multiple computers on the network sharing data and resources. In a client/server environment, however, when a client computer, e.g. 120, seeks to run an application module, the client computer may not yet have the application module installed from a server computer 110. Typically, if the requested application module is not on the server computer 110, the client computer 120 stops processing and now must wait to have a user instruct the client/server system 100 to have the application installed before another attempt to run the application may be made. Moreover, even if the requested application module is available on the client computer 120 the application module may not be a current version of that application module. The present invention, however, automatically installs the selected application module on the client computer 120 if it is not installed and automatically installs the most current version of the selected application module if a version of the application module already resides on the client computer 120. The present invention then proceeds to automatically execute the application module upon a successful installation.

Figure 2:
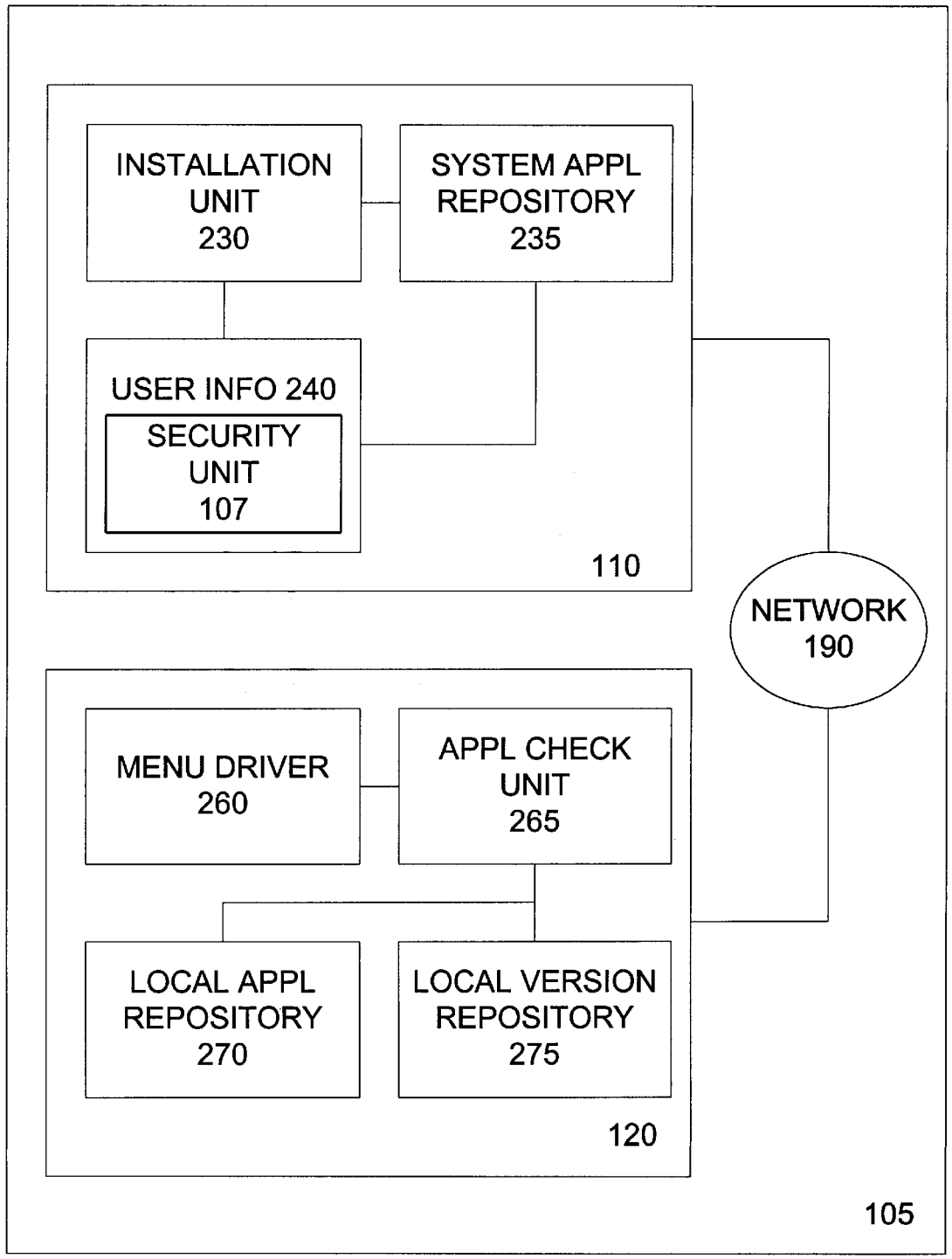
FIG. 2 is a block diagram illustrating an application installation system in accordance with the present invention.

FIG. 2 is a block diagram illustrating an installation system 105 in accordance with the present invention. The installation system 105 includes a server computer 110, such as the deployment server computer 110a of FIG. 1A, a client computer 120, such as one of the client computers 120a–120c of FIG. 1A, and the network 190. The server computer 110 includes an installation unit 230, a system application repository 235, and a user information file 240, all of which reside on the storage device of the server computer 110. The installation unit 230, the application repository 235, and the user information file 240 are coupled to one another.

The installation unit 230 coordinates the installation of application modules and updates. In an alternative embodiment, the installation unit 230 may be located in the client computer 120. The system application repository 235 stores a plurality of application suites, packages, and modules, including their components as further described below with respect to FIG. 4, which represent all the available application suites, packages, and modules in the client/server system 100. The user information file 240 includes a security unit 107 that provides security information related to each user of the client/server system 100 and the installation system 105. The security unit 107, further described in FIGS. 8B and 8C includes a list of users in the client/server system 100 and an associated list of application suites, packages, and modules available to each user.

The client computer 120 includes a menu driver 260, an application check unit 265, a local application repository 270, and a local version repository 275, all of which reside on the storage device 155 of the client computer 120. The menu driver 260 is coupled to the application check unit 265. The application check unit 265 is coupled to the local application repository 270 and the local version repository 275.

The menu driver 260 is an executable component that is loaded into the memory 150 of the client computer 120 from the storage device 155 through the bus 140. The menu driver 260 is used to launch, i.e., initiate the execution of, the application module through the central processing unit 145 after it is selected from a menu on the client computer 120 and loaded into the memory 150. Upon initiating execution of the selected application package, the menu driver calls the appropriate dynamic link libraries ("DLLs") associated with the selected application module, as described below. The application check unit 265 is a component that checks to see whether the selected application module resides on the client computer 120 and if the selected application module does reside on the client computer 120, whether the most current version of the application modules are on the client computer 120. The local application repository 270 is where the application packages, including the application modules, are stored on the client computer 120. The local version repository 275 is where application module version information is stored on the client computer 120.

Figure 3:
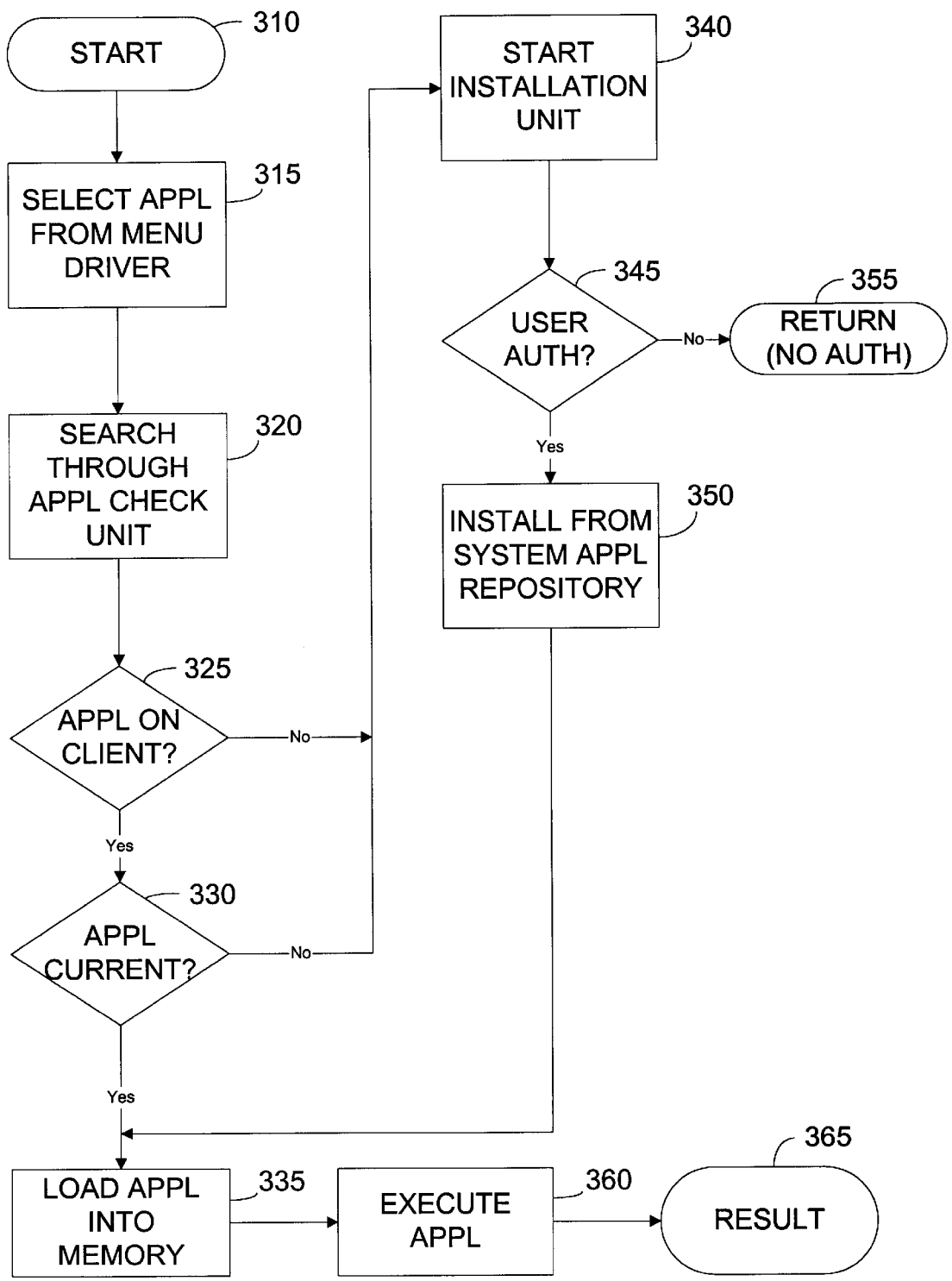
FIG. 3 is a flow diagram illustrating the operation of the installation system described in FIG. 2 in accordance with the present invention.

FIG. 3 is a flow diagram in accordance with the present invention illustrating one embodiment of the operation of the installation system 105 described in FIG. 2. Once operation starts 310, a user of the client computer 110 selects 315 an application module from a menu associated with the menu driver 260. The menu driver 260 signals the application check unit 265 to search 320 the local application repository 270 to determine 325 if the selected application module resides on the client computer 120. If the application module resides on the client computer 120, the application check unit 265 checks the local version repository 275 to determine 330 whether the current version, or update, of the application module resides on the client computer 120. If the most current version of the application module is on the client computer 120, the application module is loaded 335 into the memory of client computer 120 and executed 360 by the menu driver 260 for the user.

If the application check unit determines 325, 330 that the application module does not reside on the client computer 120 or that the current version of an application module does not reside on the client computer 120, the installation unit 230 on the server computer 110 is started 340. The installation unit 230 checks the user information file 240 to determine 345 whether the user requesting the application module is authorized to install the application module or, if the application module exists on the client computer 120, any updates to the application module. If the user is not authorized to install the application module or the updates to the application module, the server computer 110 returns 355 to the client computer 120 an error message or the like indicating that the application module cannot be installed or updated for that user. If the user clears authorization to install the application module or updates to the application module, the application module or updates are installed 350 by the installation unit 230 from the system application repository 235 on the server computer 110 to the local application repository 270 and the local version repository 275 on the client computer 120. Once the application module or updates are installed on the client computer 120, the selected application module is loaded 335 into the memory of the client computer 120 and executed 360 by the menu driver 260 for the user.

Figure 4:
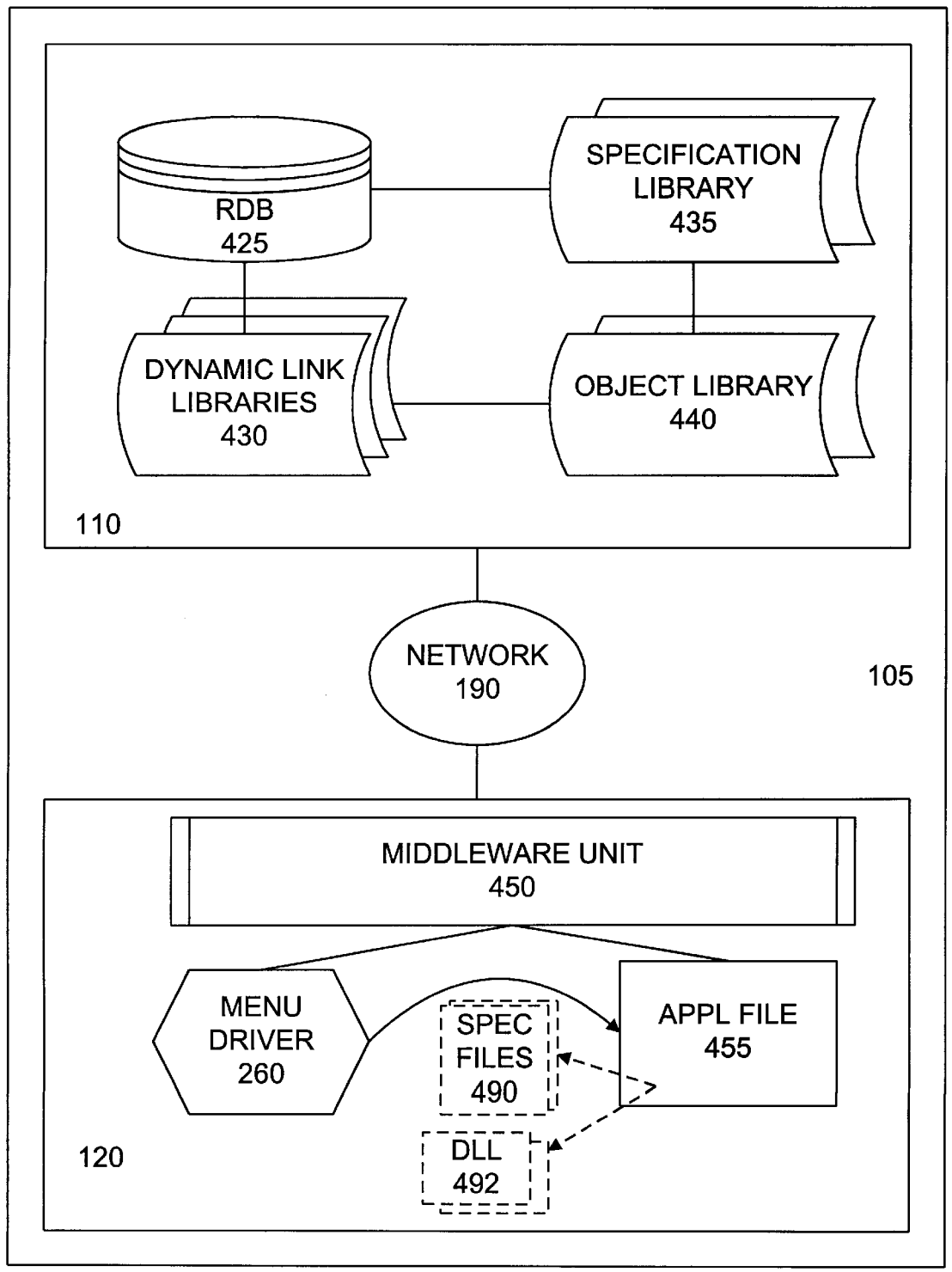
FIG. 4 is a block diagram illustrating the installation system from a modular components perspective in accordance with the present invention.

Turning now to FIG. 4, there is shown a block diagram of the installation system 105 from a modular components perspective in accordance with the present invention. The installation system 105 once again includes the server computer 110 and the client computer 120. The server computer 110 and the client computer 120 are coupled together by the network 190. The server computer 110 includes a relational database 425, a set of dynamic link libraries 430, a specification library 435, and an object library 440, all of which reside on the storage device of the server computer 110. The relational database 425 is coupled to the dynamic link libraries 430, and the specification library 435. The object library 440 is coupled to the dynamic link libraries 430. The dynamic link libraries 430 are also coupled to the specification library 435.

The relational database 425 is a commercially available conventional relational database such as SQL Server by Microsoft Corporation (Redmond, Wash.), Oracle7 by Oracle Corporation (Redwood Shores, Calif.), or DB2 by IBM Corporation (Armonk, N.Y.). The relational database 425 stores information related to all the application packages available in the client/server system 100. The dynamic link libraries 430 are comprised of a plurality of dynamic link library (DLL) files, each one or a combination of each one being an application module in the client/server system 100, and reside in a storage area of the server computer 110. The specification library 435 is a storage area that includes specification files that describe an application module through the DLL. The description of an application include information such as data entry fields, window size, and button links and placement. Each information element is referred to as a form in the present invention. The specification files are provided to the client computers 120a–120c that do not already have an existing specification files on them. The object library 440 is a storage area where object files are stored in the present invention.

Object files include business function files used by application modules. The object files are intermediary files that are linked together for the application module DLL files. Business functions are reusable application code that can be accessed by multiple application modules Business functions provide for special logic and advanced functions in the application module such as retrieving data from other files, related table input/output functions including updates and deletes, undertaking complicated calculations, data manipulation, or information assembly and sorting.

The client computer 120 includes the menu driver 260, an applications file 455, and a middleware unit 450. The middleware unit 450 is coupled to the menu driver 260 and the applications file 455. The menu driver 260 is also coupled to the applications file 455. The applications file 455 is where application components that comprise an application module including, for example, a specification files 490, and a dynamic link library ("DLL") file 492 are stored.

The menu driver 260, as described above, provides the executable file to launch the selected application module. The menu driver 260 is a commercially available conventional menu driver such as the Program Manager in Microsoft Windows™ by Microsoft Corporation (Redmond, Wash.), the DOS Shell in Disk Operating System 6.x by IBM Corporation (Armonk, N.Y.), or the J. D. Edwards OneWorld™ Menu Driver or OneWorld™ Explorer by J. D. Edwards & Co. (Denver, Colo.). The middleware unit 450 serves an intermediary that translates information between the relational database 425 of the server computer 110 and a specification file on the client computer 120. The middleware unit 450 is a commercially available middleware component such as J. D. Edwards JDB middleware by J. D. Edwards & Co. (Denver, Colo.), EDA/SQL from Information Builders, Inc., (New York, N.Y.) or MDI from Sybase, Inc. (Emeryville, Calif.). The applications file 455 is a storage area where application modules installed on a client computer 120 are stored. As described above, for each application a DLL file, e.g., the DLL file 492 shown, exists. There is a single set of specification files, e.g., the specification files 490 shown, for all the application modules installed on the client computer 120 to reference.

Figure 5:
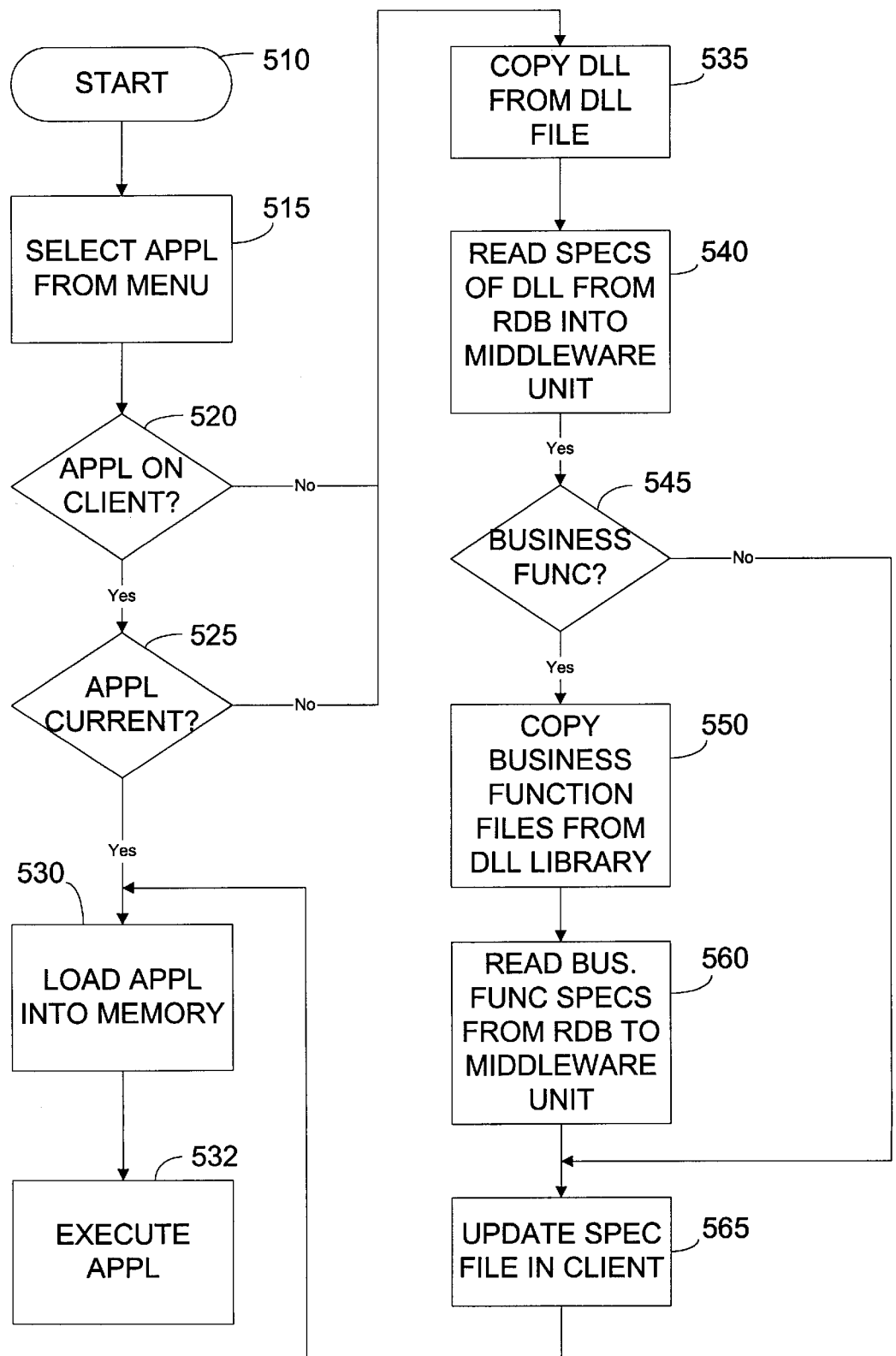
FIG. 5 is a flow diagram illustrating an operation of an installation system from the modular components perspective illustrated in FIG. 4 in accordance with the present invention.

FIG. 5 is a flow diagram illustrating one embodiment of an operation of an installation system 105 from the modular components perspective illustrated in FIG. 4 in accordance with the present invention. Once operation starts 510, the user selects 515 an application package from the menu that is associated with the menu driver 260 on the client computer 120. Similar to the process described in FIG. 3, the menu driver 260 searches the local application repository 270 and the local version repository 275 as described in FIG. 2 and, specifically the application file 455 to determine 520, 525 whether the application module is on the client computer 120 and whether there is a current version of the selected application module if the application module exists on the client computer 120. If the application module is on the client computer 120 and is a current version, the application module is loaded 530 into the memory of the client computer 120 and executed 532 by the menu driver 260 of the client computer 120 as similarly described in FIG. 3.

If the application module is not on the client computer 520 or is not a current version, the installation unit 230 described in FIGS. 2 and 3 is triggered to install the application module or if the application module exists on the client computer, but is not current, the current version on the client computer.

Once the installation unit 230 determines that the user has the authority to install the application module or the current version, the application module or update is installed from the system application repository 235 on the server computer 110 to the client computer 120 as described in FIGS. 2 and 3.

Specifically, from the system application repository 235 the application module DLL is copied 535 from among the dynamic link libraries 430 on the server computer 110 to a DLL file, such as the DLL file 492 of FIG. 4, in the application file 455 on the client computer 120. The DLL file 492 also provides specifications of the application module, such as window size, fields, buttons, and links. These specifications are stored in the relational database 425 and are read 540 into the middleware unit 450 on the client computer 120. The installation system 105 then determines 545 whether there are additional business functions for the application module. If there are no additional business functions for the application module, the middleware unit 450 updates specification files 490 on the client computer 120 to include the specification information for the installed application module. The application module can now be loaded 530 into the memory 150 of the client computer 120 and then executed 532 by the menu driver 260 of the client computer 120.

If there are additional business functions for the application module, the business function, or business logic, files are copied 550 from the DLL library on the server computer 110 to a DLL directory, such as the DLL in FIG. 4, in the application file 455 on the client computer 120. In addition, the middleware unit 450 reads the business function specifications from the relational database 425. The middleware unit 450 then updates 565 the specification files 490 in the client computer 120 with the application module and business function specifications. Once installed, the application module may be loaded 530 into the memory 150 of the client computer 120 and then executed 532 by the menu driver 260 of the client computer 120.

An advantage of the present invention is that an application module that has been selected at the client computer 120, but does not reside or is not a current version at the client computer 120, may be installed and executed on the client computer 120 without having to halt processing of the request or without having a user manually install the application module or an update of the application module. Thus, the present invention allows for the selection and execution of a current version of a selected application module in one step regardless of whether the application module is installed on the client computer 120 or, if there is a version of the selected application module installed on the client computer 120, whether that version is the most current version. Therefore, the present invention ensures that application files are installed on the client computer 120 only when necessary, thereby saving system resources such as storage device space. Moreover, the present invention provides additional data integrity and security by automating the installation process and preventing problems such as accidental file overwrites, file corruption, and unauthorized file installation.

Figure 6:
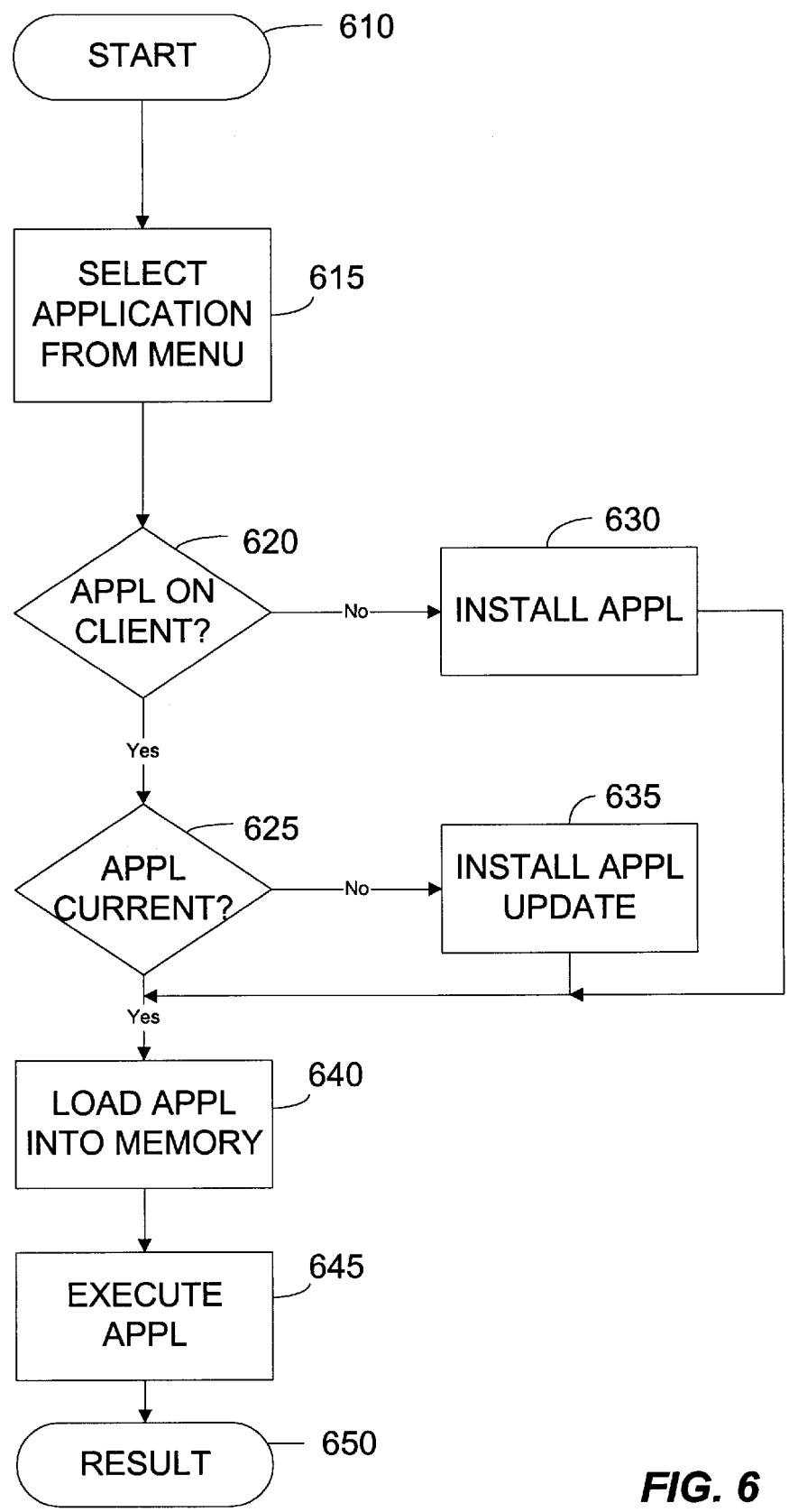
FIG. 6 is a flow diagram generally illustrating a process for installing an application module or an update or current version of the application module on an as needed basis on a client computer in accordance with the present invention.

Turning now to FIG. 6, there is shown a flow diagram that generally illustrates a process for installing application modules or updates to the application modules on an as needed basis in accordance with the present invention. The process starts 610 by selecting 615 an application module from a menu on the client computer 120. The process then determines 620 whether the application module is on the client computer 120. If the application module is not on the client computer 120, the process installs 630 the application module from the server computer 110 to the client computer 120 before loading 640 the application module into the memory 150 of the client computer 120 and then executing 645 the application module on the client computer 120. If the selected application module is currently installed on the client computer 120, the process determines 625 whether the application module is the most current version. If the application module version is not current, the process updates 635 the application module by installing the most current version of the application module from the server computer 110 to the client computer 120, before loading 640 the application module into the memory 150 of the client computer 120 and executing 645 the application module on the client computer 120.

FIGS. 7 through 10 are flow diagrams further illustrating an installation system process and related processes for installing an application module on an as needed basis and executing the application module in accordance with the present invention.

Figure 7:
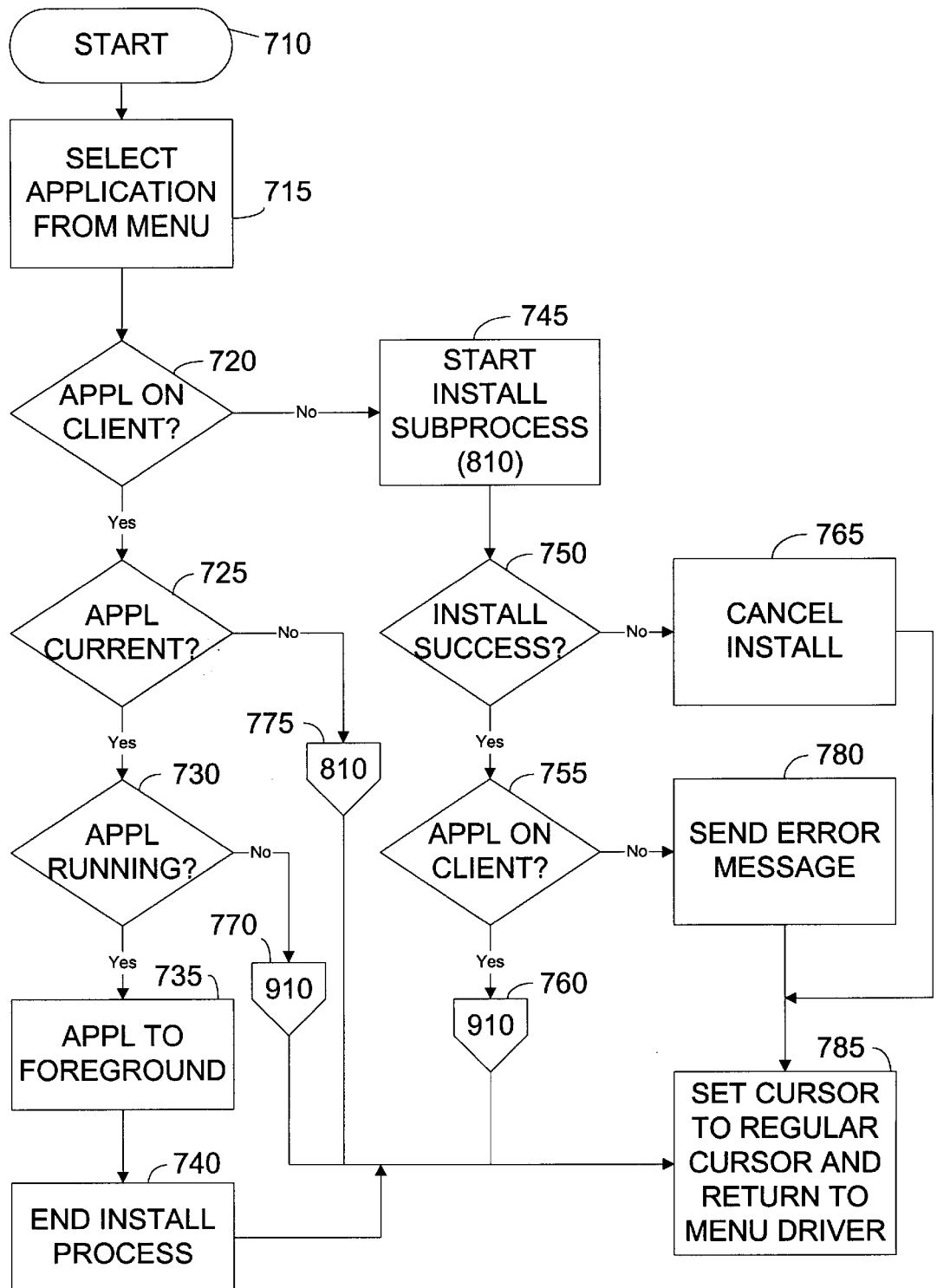
FIG. 7 is a flow diagram illustrating a process for installing an application module on an as needed basis on a client computer in accordance with the present invention.

Referring specifically to FIG. 7, processing starts 710 when an application module is selected 715 from a menu on the client computer 120. The process determines 720 if the application module is on the client computer 120. If the application module is on the client computer 120, the process determines 725 whether the application module is a current version. If the application module is a current version, the process determines 730 whether the application module is executing. if the application module is executing, the application module is brought 735 to the foreground of a display screen of the client computer 120 and the installation system process is ended 740. The cursor is then returned 785 to the menu driver 260.

If the determination 720 indicates that the application module is not on the client computer 120, an installation subprocess for the selected application module is started 745 as is further described in FIG. 8. Once the install subprocess is completed, the installation system process then determines 750 whether the installation of the application module was successful. If the installation was successful, the installation system process determines 755 whether the application module is on the client computer 120. If the application module is on the client computer 120, the application module is loaded into the memory 150 of the client computer 120 for execution by the processor 145 as is further described in FIGS. 9 and 10. Once the application module has completed execution, the cursor is returned 785 to the menu driver 260. If the check 750 indicates that the application module was not installed successfully, the installation process is canceled 765 and the cursor is returned 785 to the menu driver 260. If the application module is successfully installed, but the check 755 indicates that the application module is not found on the client computer 120, an error message is sent 780 to the display screen of the client computer 120 and the cursor is returned 785 to the menu driver 260.

If the application module was on the client computer 120 when the application module was selected 715, but the check 725 determined that the application module was not current, the installation subprocess is started 775 for installing a current version of the application module onto the client computer 120. The installation subprocess is further described in FIG. 8A. If the selected 715 application module is on the client computer 120 and is a current version, but the check 730 indicates that the application module is not yet running, the application module is prepared 770 for execution as is further described in FIGS. 9 and 10. Once the application module completes execution, the cursor is returned 785 to the menu driver 260.

Figure 8A:
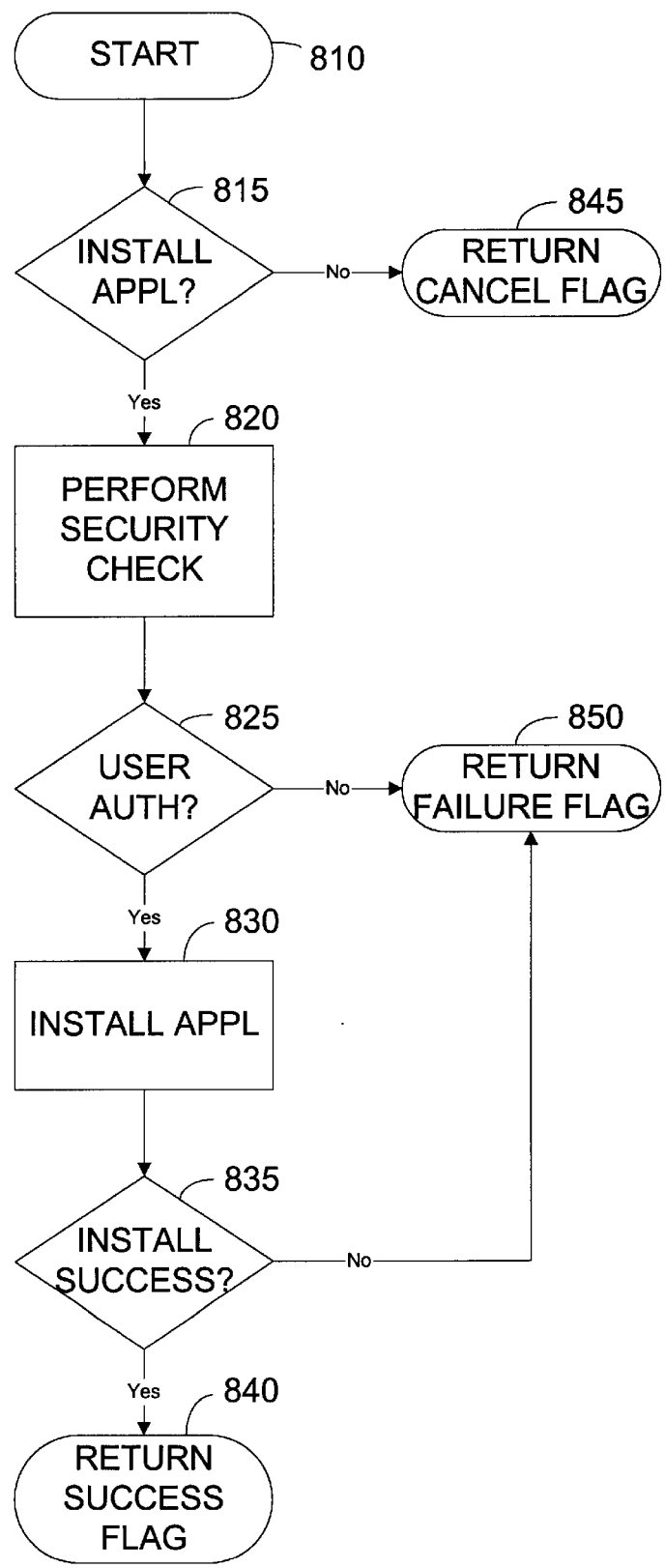
FIG. 8A is a flow diagram illustrating an installation subprocess for installing an application module or an update or current version of an application module in accordance with the present invention.

FIG. 8A is a flow diagram illustrating an installation subprocess for installing an application module or an update or current version of an application module. Processing starts 810 when an application module or an update or a current version of an application module is summoned to be installed (from steps 745 and 770 of FIG. 7). The installation subprocess determines 815 whether the application module or update should still be installed. If the installation process has been canceled or does not continue, a cancel flag is returned 845 to the general installation system process. If the installation subprocess continues, a security check (security process routine) is performed 820 to determine 825 whether the user is authorized to install the application module or the current version of the application module.

Figures 8B, 8C:
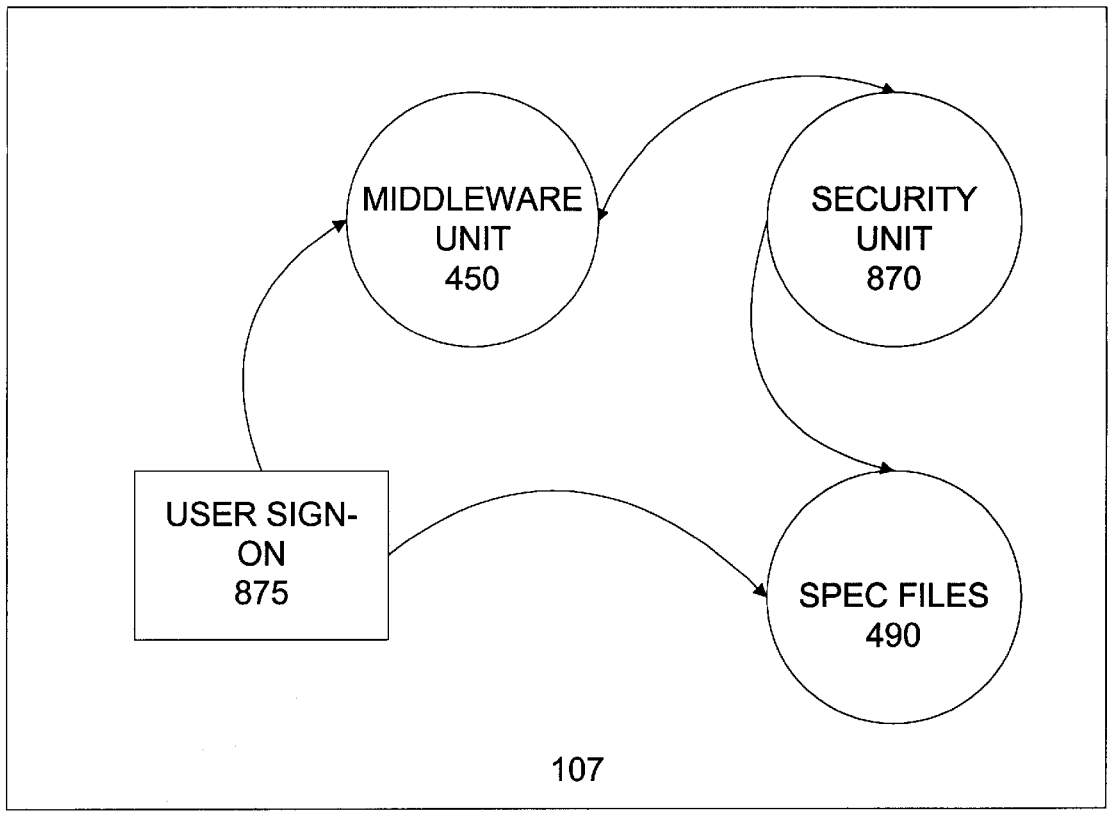
FIGS. 8B and 8C respectively provide a diagram and a table illustrating a security system and subprocess and a security table in accordance with the present invention.

FIGS. 8B and 8C illustrate a security system and process and a security table 880. To determine 825 whether the user has authorization to install the application module or current version of the selected application module, a security process routine references a security table to see whether there is a "hit" (further described below) on one of the categories of security.

Referring first to FIG. 8B, the security system 107 process begins with a user of the client/server system 100 signing 875 onto the system 100 from the client computer 120 using a user identification, or userid, sign-on. The individual user's access to the client/server system 100 and associated resources is based on the userid. The entered userid goes through the middleware unit 450 on the client computer 120, which in turn interfaces with the security unit 870. The userid also provides access to server computer 110 files associated with the database or databases residing on the server computer 110. Depending on the entered userid, the system 100 determines the level of access that the user assigned to the userid has to application modules on the client/server system 100.

To find the level of access that the user is permitted to have, the security unit 870 references the security table 880 illustrated in FIG. 8C. The security table 880 comprises a user grouping 885 and an application grouping 890. Each grouping 885, 890 is arranged from a specific level to a general level. The user grouping 885 is broken down into three categories—the individual user, a group of users, and public users which is all users in the client/server system 100. The application grouping 890 is broken down into individual application modules, application suites, which is a group of application modules, and all application modules.

Specifically, the security unit 870 first determines whether the individual user has access at the application module level, the application suite level, or the all application modules level. If there is a "hit" with the userid, that indicates that a flag has been encountered with respect to that userid. If the hit indicates that the user has security authorization to install the application module, then the security check is completed and the process is returned to continue the installation 830 of the application module. If there is a hit that indicates that the user is not authorized to install the application module, then a failure flag is returned 850 to the installation system process and the installation process is halted. If there is no hit, on the userid, the next level of security is checked.

The next level from the user level that the security unit 870 checks is the group level. Similar to the user level, the group level is checked at the application module level, the application suite level, and then for all application modules.

Once again, if there is a hit, the flag that is encountered is checked to determine whether there is authorization or not to install the application module. If there is authorization, the security process allows the application to be installed 830 and no firer security checks are required. If the encountered flag indicates that the user lacks authorization, installation of the application module and/or the update to the application module will be halted and a failure flag will be returned 850 to the installation system process. If there are no hits, the last level of security is checked.

The last level of security is the public level and again, the security unit 870 checks for access at the application module level, the application suite level, and the all application modules level. Once more, if there is a hit the flag that is encountered is checked to determine whether there is authorization or not to install the application module. If there is authorization, the security process allows the application to be installed 830 and no further security check is required. If the encountered flag indicates that the user lacks authorization, installation of the application module or modules and/or the update or updates to the application module will be halted and a failure flag will be returned 850 to the installation system process. If the user clears security at the public user level, such that there were no hits at that level either, the user is granted access to the application module or modules. The user will be permitted to respectively access and copy the necessary files from the relational database 425 and appropriate libraries 430, 435, 440 on the server computer 110 to the specification files 490 and the appropriate files 492, 494 on the client computer 120.

Turning back to FIG. 8A, once it is determined 825 that the user has authorization, the application module and/or the current version of the application module may be installed 830, as described above. Specifically, referring to FIG. 5, the DLL file (or DLLs) are copied 535 from among the dynamic link libraries 430 on the server computer 110 to a DLL file, e.g., the DLL file 492 of FIG. 4, in the application file 455 on the client computer 120. The specification information provided by the DLL file 492 is also copied from the relational database 425 on the server computer 110 into the middleware unit 450 on the client computer 120. If there are business functions (e.g., complicated equations or computational operations) associated with the application module the business function files are copied 550 from the server computer 110 to the client computer 120.

The specifications associated with the application (e.g., window size, data entry fields, and interaction buttons) are copied 560 from the relational database 425 on the server computer 110 to the middleware unit 450 on the client computer 120. The specifications that are in the middleware unit 455 of the client computer 120, from the application module DLL file 492 and the business function files, are used to update 565 the specification files, e.g., the specification files 490 of FIG. 4, which is located on the client computer 120. The specification files 490 on the client computer 120 are used by the DLL file 492 during execution of the application module and provide the form information associated with the application module, such as window size, data entry fields, interaction buttons, and other display screen information.

Referring again to FIGS. 7 and 8A, if the installation subprocess determines 835 that the appropriate application module files and specifications did not install successfully on the client computer 120, a failure flag is returned 850, 750 to the general installation system process so that the installation may be canceled 765. If the application module and/or update or current version of the application module is successfully installed on the client computer 120, a success flag is returned 840, 750 to the general installation system process so that the process may continue to attempt to execute the selected application module that was just installed or updated on the storage device 155 of the client computer 120.

Figure 9:
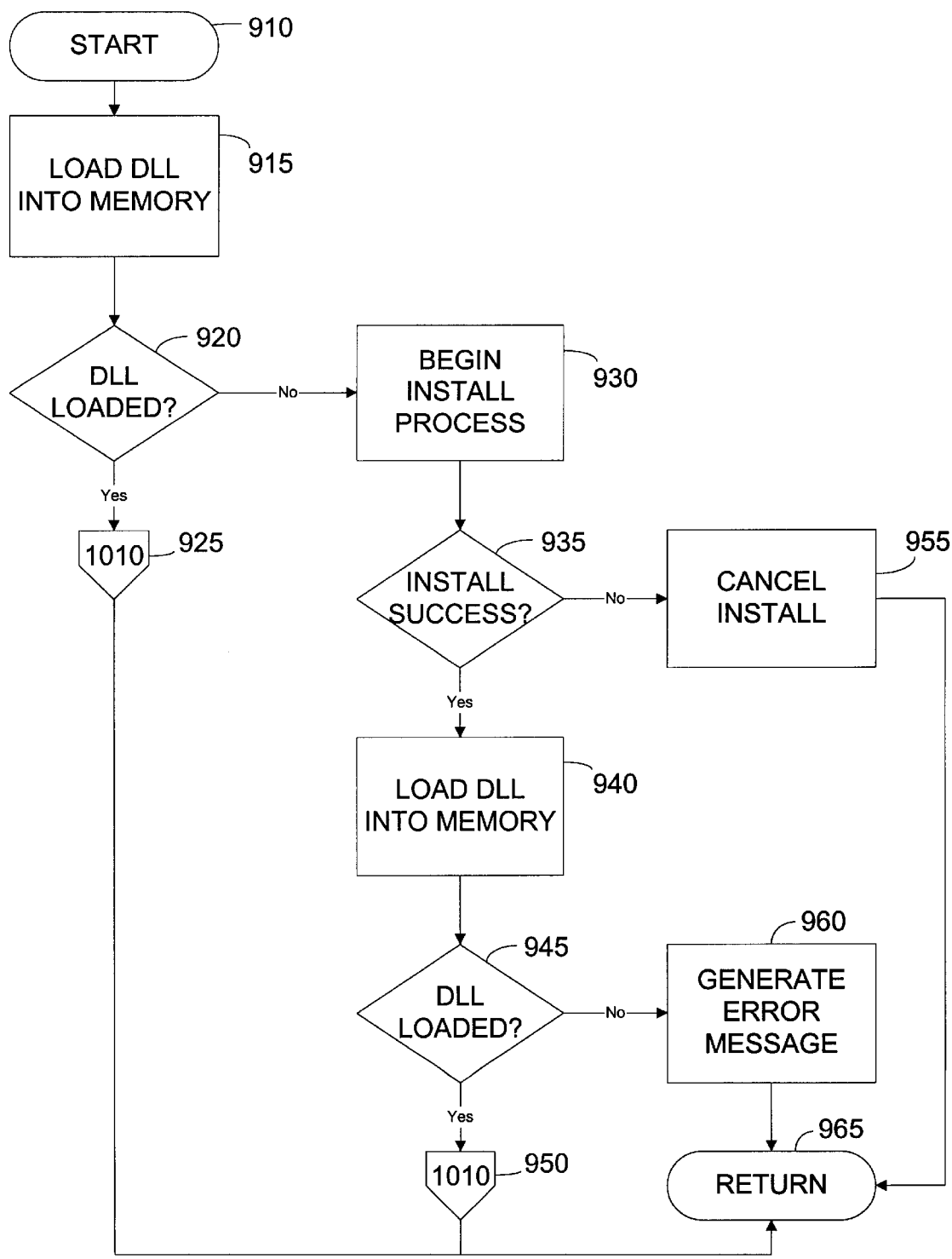
FIG. 9 is a flow diagram illustrating a subprocess for loading a dynamic link library of an application module into a client computer 120 memory in accordance with the present invention.
Figure 10:
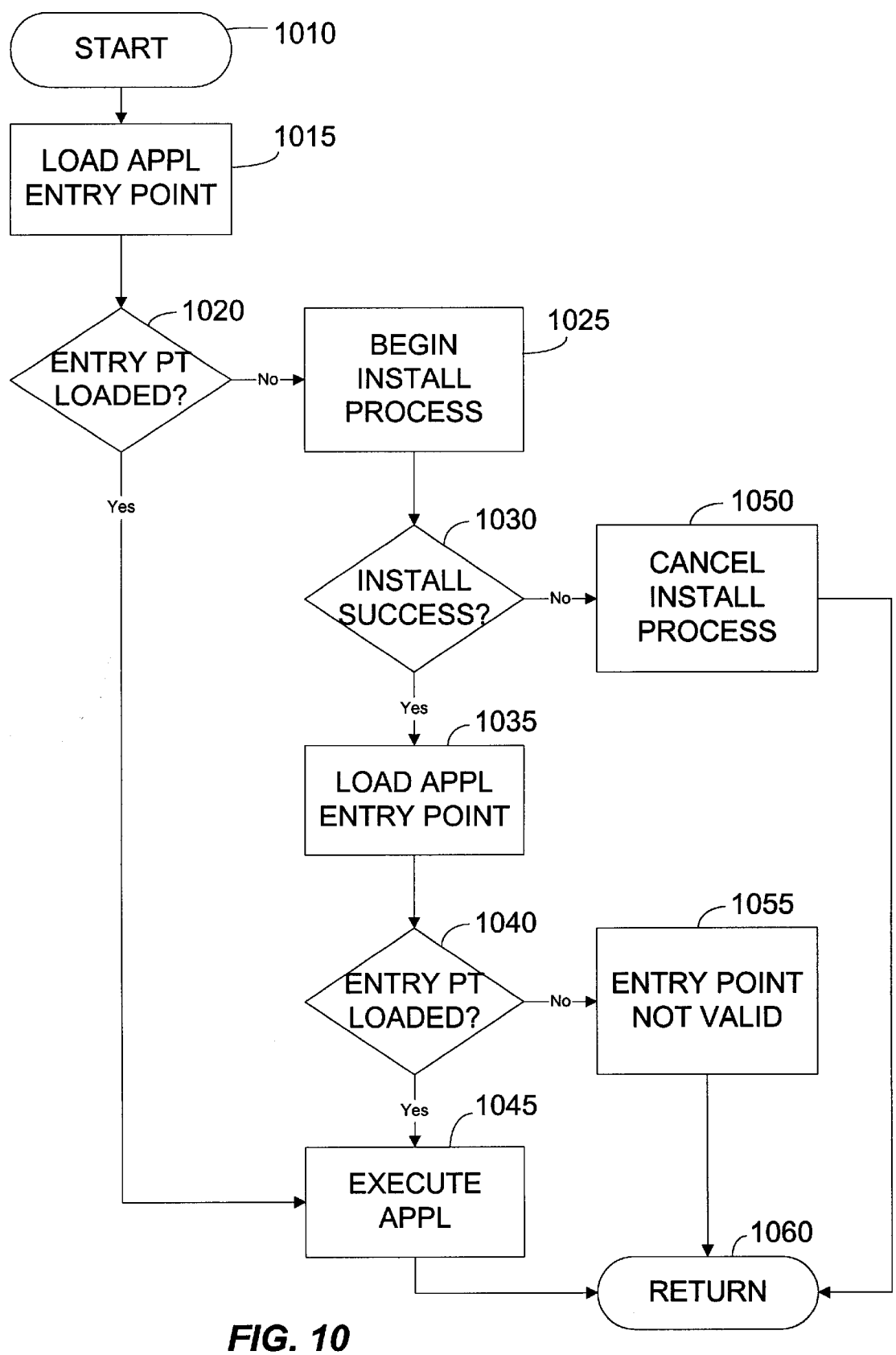
FIG. 10 is a flow diagram illustrating a subprocess for selecting an entry point for the application module and executing the application module in accordance with the present invention.

FIGS. 9 and 10 show flow diagrams of subprocesses for executing the selected application module in accordance with the present invention. FIG. 9 is a flow diagram illustrating one embodiment of a subprocess for loading a DLL file of an application module into the memory of the client computer 120. The subprocess starts 910 once the application module is installed, and is a current version, (720, 725, 770, 755, 760 from FIG. 7) on the client computer 120. The process attempts to load 915 a DLL file, e.g., the DLL file 492 of FIG. 4, into the memory 150 of the client computer 120. The loading subprocess then determines 920 whether the attempt to load the DLL file 492 into the memory 150 of the client computer 120 was successful. If the DLL file 492 was not loaded into the memory 150 of the client computer 120, the loading subprocess attempts to begin installation 930 of the application module and/or the update or current version of the application process onto the storage device 155 using the installation subprocess described above in FIGS. 8A–8C.

The loading subprocess determines 935 whether the installation of the application module or the current version of the application module was successful. If the installation was unsuccessful, the installation is canceled 955 and a cancel flag is returned 965 to the process step calling for the execution of the application module. If the installation was successful, there is an attempt to load 940 the DLL file 492 into the memory 150 of the client computer 120 and once more the loading subprocess determines 945 whether the DLL file 492 is loaded. If it is determined 945 that the DLL file 492 has still not loaded, an error message is generated 960 and returned 965 to the process step calling for the execution of the application module.

After the DLL file 492 has been successfully loaded into the memory of the client computer 120, the application module is ready to be executed once an entry point has been identified 925, 950. An entry point is a complete application form including buttons and/or fields of an application. FIG. 10 is a flow diagram illustrating a subprocess for selecting an entry point for the application module and executing the application module. Once the application module is installed and brought up on the client computer, e.g., a computer screen, the user selects a form from within the application module. The forms are described above in FIG. 4. Thus, a form serves as an entry point for the application module. As described above, an application module includes a logical group of forms. An application module may include, for example, a find/browse form with a grid that displays a list of data and a fix/inspect form that allows the data to be updated. For example, in a preferred embodiment the find/browse form provides an entry point for the application module that would seek to update the data using the fix/inspect form.

The entry point is loaded 1015 and the entry point subprocess determines 1020 whether the entry point was indeed loaded into the memory 150 of the client computer 120. If the entry point was not loaded, the installation process described in FIG. 8 begins 1025. Typically, an entry point may not be loaded 1015 when the application module itself, or portions of the application module, did not load. For example, if an application module has been updated to incorporate a new form, the entry point within that application module may not be available until the application module is updated at the client computer 120. When the entry point is successfully loaded 1040, the application module is executed 1045. When the application module completes executing, the cursor is returned 1060, 785 to the menu driver.

The present invention provides a system and a method for installing application modules and updates from a server computer 110 to a client computer 120 on an as needed basis. The present invention offers a benefit of installing the application module or update and then executing the application without halting operation of the application system despite the fact that the application module, or the most current version of the application module, does not yet reside on the client computer 120. Thus, the present invention offers a benefit of saving system resources such as storage device space because application modules are not installed on the client computer 120 until a user is ready to use the application module. Further, the present invention automatically installs the application module and/or the update without user intervention. Thus, the present invention offers advantages such as preventing incorrect file installation, accidental file erasure, overwriting of other application files, or installation of files to which the user is not authorized to access.

In an alternative embodiment, the functions of the client computer 120 and the server computer 110 may be reversed. Thus, an application module or an update may be installed on a server computer 110 from a client computer 120 on an as needed basis. For example, if an application module was developed on a client computer 120, it may be installed on the server computer 110 when the server computer 110 updates the system application repository 440. In another embodiment, an application module or an update may be installed from a server computer 110a to another server computer 110b or from a client computer 120a to another client computer 120b.

While particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. In a computing system having a first node for storing available applications in the computer system and a second node for executing a desired application from the available applications, a system to install at least a potion of the desired application from the first node to the second node, comprising:

a system application repository, located in the first node, for storing a plurality of application specifications defining the available applications, the application specifications including dynamic link library information defining application modules for the available applications, function information accessed by said dynamic link library information to describe functionality associated with said application modules, form information describing display information for said application modules through said dynamic link library information, and a menu driver, located in the second node, for selecting the desired application;

a local application repository, located in the second node, for storing the application specifications required to execute the desired application;

a check unit, located in the second node and coupled to the menu driver, for determining whether said required application specifications are stored in the local application repository;

an installation unit, coupled to the first node and the second node, for installing said required applications specifications from the first node to the local application repository in response to the check unit determining that one or more of said required application specifications are not stored in the local application repository, at least a portion of the installed required application specifications being used to define the desired application for execution; and a middleware unit, coupled to the system application repository and the local application repository, for transmitting said required application specifications between the system application repository and the local application repository.

2. The system as in claim 1, wherein the system application repository further comprises a relational database for storing said specification information.

3. The system as in claim 1, further comprising a local version repository located in the second node, for storing version information or the desired application defined at the local application repository, the version information being based on the portion of the required application specifications used to define the desired application.

4. The system as in claim 3, wherein the installation unit updates the local version repository with current version information for the desired application.

5. The system as in claim 4, wherein the local application repository further comprises an application file having a specification file for storing said specification information of the desired application defined at the local application repository.

6. The system as in claim 1, wherein the system further comprises a user information file, located in the first node, for providing user information on the desired application available to each user of the system.

7. The system as in claim 1, wherein the system application repository further comprises:

a relational database, for storing said specification files;

a specification library, coupled to the relational database, for storing said form information;

a dynamic link library, coupled to the relational database and the specification library, for storing said dynamic link library information; and an object library for storing said function information.

8. In a computer system including a first node having a system application repository for storing a set of available applications in the computer system and a second node having a local application repository for storing a desired application from the set of available applications, the second node having a menu, a method for installing at least a portion of the desired application from the first node to the second node, comprising:

storing application specifications in the system application repository including dynamic link library information defining application modules for the available applications, function information accessed by said dynamic library information to describe functionality associated with said application modules, form information describing display information for said application modules through said dynamic link library information, and specification information defining said function information and said form information;

listing at least a subset of the available applications, including the desired application, on the menu;

selecting the desired application from the menu;

determining whether said application specifications required to execute the desired application is installed in the local application repository;

installing said required application specifications from the system application repository to the local application repository in response to determining that one or more of said required application specifications are not installed at the second node;

identifying an installation version of said required application specifications for the desired application in the local application repository in response to determining that said required application specifications are installed in the local application repository; and installing a current version of said required application specifications from the system application repository to the local application repository in response to identifying the installation version of said required application specifications at the second node as not the current version.

9. The method as in claim 8, wherein installing the desired application, further comprises:

linking, through a middleware unit, the system application repository to the local application repository;

copying said required application specifications associated with the desired application from the system application repository to the local application repository;

reading said required specification information associated with the desired application into a local specification file in the local application repository;

storing said required dynamic link library information in a local dynamic link library file; and maintaining said local specification file and said local dynamic link library file in a local application file to define the desired application in the local application repository.

10. The method as in claim 9, further comprising executing the desired application at the second node.

11. The method as in claim 10, wherein the executing further comprises loading the desired application into a memory of a client computer.

12. The method as in claim 11, wherein loading the desired application further comprises loading an application entry point.

* * * * *

UNITED STATES PATENT AND TRADEMARK OFFICE
CERTIFICATE OF CORRECTION

PATENT NO. : 5,960,204
DATED : September 28, 1999
INVENTOR(S) : Glenn S. Yinger, Charles E. McVaney and James L. Foos It is certified that error appears in the above-identified patent and that said Letters Patent is hereby corrected as shown below:

Column 13:
Line 65, after "and" insert --specification information defining said function information and said form information;--

Column 14:
Line 9, replace "applications" with --application--.

Column 16:
Line 19, replace "claim 9" with --claim 8--.

Signed and Sealed this

Nineteenth Day of June, 2001

Attest:

NICHOLAS P. GODICI
Attesting Officer
Acting Director of the United States Patent and Trademark Office